July 17, 1962 J. J. HARTNETT 3,044,350
OPTICAL PRINTER DRIVE AND CONTROL MECHANISM
Filed April 6, 1961 5 Sheets-Sheet 1

FIG. 1

July 17, 1962 J. J. HARTNETT 3,044,350
OPTICAL PRINTER DRIVE AND CONTROL MECHANISM
Filed April 6, 1961 5 Sheets-Sheet 2

July 17, 1962 J. J. HARTNETT 3,044,350
OPTICAL PRINTER DRIVE AND CONTROL MECHANISM
Filed April 6, 1961 5 Sheets-Sheet 5

3,044,350
OPTICAL PRINTER DRIVE AND CONTROL
MECHANISM
John J. Hartnett, Bronx, N.Y., assignor to The Animation Equipment Corporation, New Rochelle, N.Y., a corporation of New York
Filed Apr. 6, 1961, Ser. No. 101,210
9 Claims. (Cl. 88—24)

The present invention relates to drive and control mechanism of optical printers of the type in which a projector is in optical alignment with a camera for projecting from fine grain strip film translated step-by-step through the former images carried by frames thereof photographically to raw stock film translated in similar fashion through the camera.

In order to attain various effects in the camera film so photographed by such equipment means are provided which are intended to translate the projector and camera films either in frame synchronism (hereinafter referred to as "in sync.") or 180° out of frame synchronism (hereinafter referred to as "180° out of sync."), and either for only single frames or through a plurality or (n) number frames.

"In sync." operation involves the location of the trailing half of a preceding projector fine grain film frame and the leading half of the succeeding frame thereof to be photographed at the projector aperture when a complete camera raw stock film frame is at the camera aperture. While the camera shutter is being opened, the projector film is moved the other one half frame so that the full frame to be photographed is at the projector aperture at the instant the camera shutter is fully open with the full camera frame at the camera aperture. Then, as the camera shutter closes, the projector film is moved another one half frame so that the trailing half of this frame and the leading half of the next succeeding projector film frame are at the projector aperture, and the camera film is moved a full frame to be exposed as the projector film is again moved another half frame while the camera shutter is again opening again to locate at the projector aperture the instant of the full opening of the camera shutter the leading and trailing halves of this succeeding projector film frame for photographing it. "180° out of sync." operation involves the movement of a full frame of the projector film to the projector aperture in pace with movement of a full frame of camera film to the camera aperture. Thus, 180° out of sync. operation does not require use of the non-skip and non-repeat film frame means of the present invention since electromagnetic stop motion devices respectively associated with the separate projector and camera drives will be moved to stop and holding engagements of the latter at successively different times, about one half revolution apart.

The present invention is concerned only with problems of in sync. operation of such equipment and where each such operation is to be continued through (n) number of frames. If, in the in sync. operation, the energizing master control switch which stops and starts the optical printer happens to be opened the instant that one of electromagnectic stop motion devices has its latching armature in engaging position to effect stopping of either the drive of the projector unit or the drive of camera unit it will do so, thereby preventing translation of the film in that particular photographic unit another frame. Should, at this master control switch opening instant, the latching armature of the other electromagnetic stop motion device be in a position other than to engage the drive of the other photographic unit and stop it, such as may result from this latter drive angularly leading the other drive slightly which frequently occurs, the film being translated through this latter photographic unit will be moved one more frame while the other film is stopped. Thus, if the projector unit drive is slightly leading the camera unit drive and the master control switch is opened the instant that the camera unit drive is in a position to be engaged and immediately stopped by the latching armature of the electromagnetic stop motion device associated with the latter drive, the camera mechanism will be stopped but the projector mechanism will translate the projector film one more frame. Consequently, this projector film frame is lost, which is termed a "skipped frame." If the reverse condition exists at the instant the master control switch is opened the projector mechanism will be stopped immediately but the camera film will be translated one more frame to provide an unwanted duplicate of the preceding frame, and this is termed a "repeated frame." Inertia of parts, impossibility of engaging and disengaging separate friction drive clutches as are frequently used in such projector and camera drives, and other lag characteristics of the drive and control mechanisms of such optical printers make it impossible to keep the projector and camera drives precisely in synchronism during their periodic operations in the in sync. condition, resulting at times in serious undesirable skipped and repeated frames. The present invention has for an object the efficient solution of this troublesome problem by incorporating an unique non-skip and non-repeat film frame control means of simple construction and effective operation.

A more specific object of the invention is to provide in such an optical printer such non-skip and non-repeat film frame control means that assures if at the instant of opening the master control switch the drive of one of the projector and camera photographic units is beyond the position where it can be stopped by latching means, so that one more frame of the film being translated therein is advanced, the drive of the other photographic unit will be prevented from being stopped and held at this instant to permit the other film translated in the latter also to be advanced one more frame.

A further object of the invention is to provide a structural embodiment of the apparatus which is readily and economically constructed and installed and which permits efficient use and operation of the optical printer in which it is embodied.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

It will be seen from the drawings that the optical printer drive and control mechanism there illustrated, which attains synchronous operation of a projector and camera thereof, includes power driving means, which may be a common mechanical drive, a first projector mechanism driving means, and a second camera mechanism driving means. In association therewith there is provided projector drive clutch means which has engageable and disengageable rotary driving and driven members with the drive member connected to the power driving means and the driven member comprising a portion of the first projector mechanism driving means, so as to couple the power driving means to and uncouple it from the projector driving means. Similarly, there is provided camera drive means having engageable and disengageable rotary driving and driven members with the driving member connected to the power driving means and the driven member comprising a portion of the second camera mechanism driving means, so as to couple the power driving means to and uncouple it from the camera driving means. Projector stop motion electromagnetic means are provided which have magnetically-operated latch means engageable of the first projector mechanism driving means temporarily to stop and hold the latter in a predetermined stop and start position and alternately to release it. In similar fashion there is provided camera stop motion electromagnetic means having magnetically-operated latch means engageable of the second camera mechanism driving means temporarily to stop and hold the latter in a predetermined stop and start position and alternately to release it. The apparatus includes first power supply control means in the form of electrical circuitry connecting the projector and camera stop motion electromagnetic means in parallel and this circuitry includes common master control switch means for simultaneous energization and de-energization thereof. Other power supply control means is provided for the pair of projector and camera drive clutch means and it includes a pair of individual operating means separately to engage and disengage their driven members with their driving members and with each of these individual clutch operating means being operable only by one of the stop motion electromagnetic means associated therewith for alternately coupling and uncoupling its driving and driven clutch members to actuate it separately from actuation of the other of these clutch means. The present invention provides in combination with these devices a non-skip and non-repeat film frame control means which is associated with one of the stop motion electromagnetic means and comprises a by-pass holding circuit connecting the first power supply circuitry around the common control switch means to both of the stop motion electromagnetic means. In this by-pass holding circuit is connected in series a pair of circuit opening and closing means with a first one thereof being closed upon energization of the stop motion electromagnetic means with which it is associated and being open upon de-energization of the latter. This non-skip and non-repeat film frame control means also includes timing means connected to the mechanism driving means which is stopped and released by the stop motion electromagnetic means with which the first by-pass holding circuit opening and closing means is associated for operation by this mechanism driving means. The timing means effects closure of the second circuit opening and closing means in the by-pass holding circuit when the master control switch is opened the instant this mechanism driving means reaches its start and stop radial position and holds it closed thereafter for only a predetermined portion of each cycle of rotation of the latter. Preferably the closing, holding and opening of the by-pass holding circuit by the timing means is assured by the timing means effecting the circuit closure prior to the instant the second camera mechanism driving means reaches its stop and start radial position and holds this circuit closed through this position and during a predetermined portion of each cycle of rotation of the mechanism driving means after rotary drive of the latter has started.

Each of the projector and camera drive clutch means may be of a mechanical nature employing mechanical operating means alternately to couple together and uncouple from each other the driving and driven clutch members thereof. The mechanical coupling and uncoupling means of each clutch means may be manipulated by mechanical mechanism operated by a movable member driven or manipulated by the particular stop motion electromagnetic means which is associated therewith, or it may be manipulated by intervening electrical means which respond to operation of a switching device in the power supply circuit of the latter with this switching device in turn manipulated by the particular stop motion electromagnetic means which is associated therewith. In practical embodiments it may be preferred that each of the projector and camera drive clutch means be in the form of a conventional magnetic clutch with the power supply control means for the magnetic clutches being in the form of power supply circuitry including a pair of energizing circuits with each energizing circuit connected to one of the magnetic clutches. In the latter case each of these energizing circuits may include circuit opening and closing means or a control switch distinct from such means or control switch in the other energizing circuit and operable by the stop motion electromagnetic means associated with the particular magnetic clutch which is connected to this energizing circuit.

Figure 1:
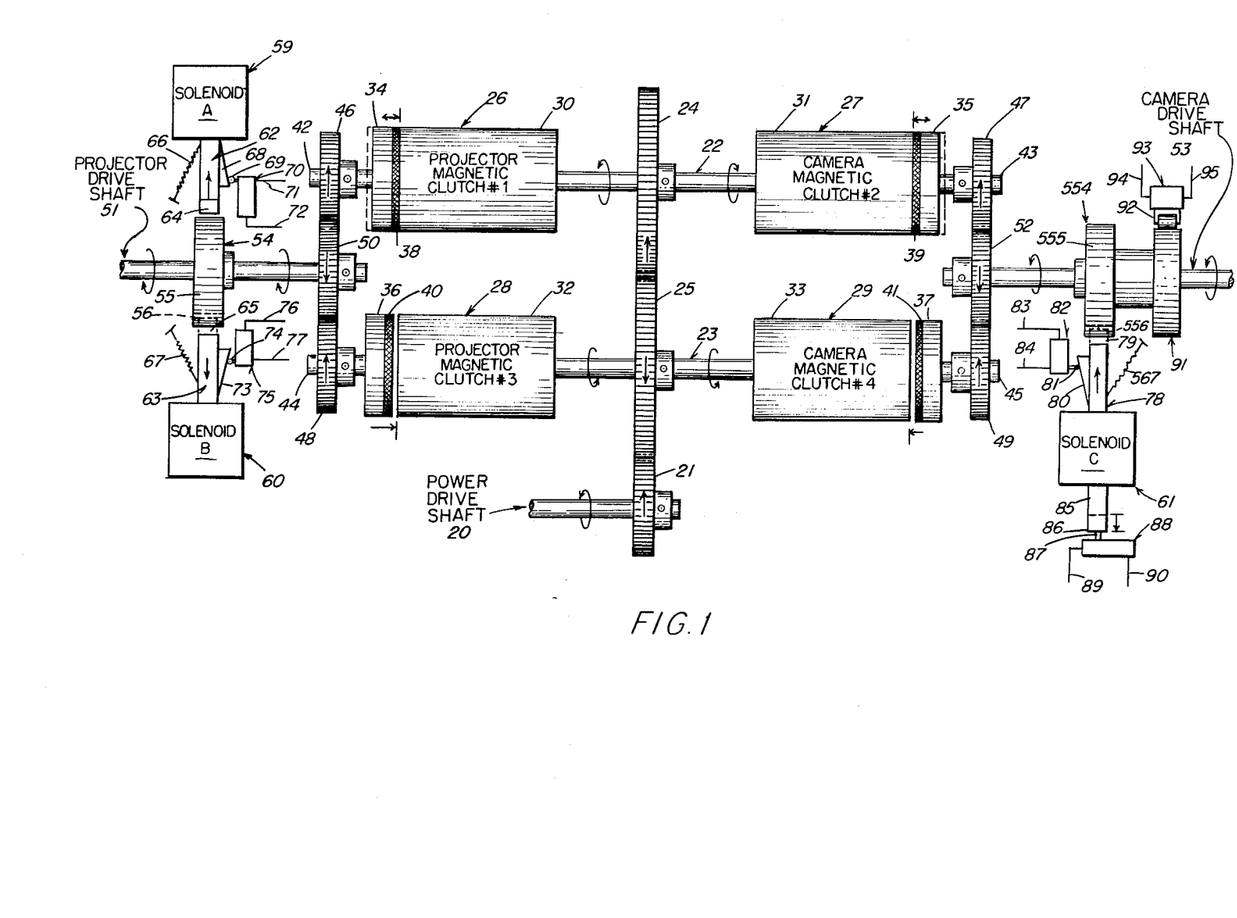
FIG. 1 is a plan view, somewhat diagrammatic in nature, of the mechanical parts of the drive and control mechanism and associated switches of an optical printer embodying the present invention.

Referring to the drawings for a more specific description, in which like numerals identify similar parts throughout, it will be seen from FIG. 1 that the drive mechanism of the optical printer illustrated therein, by way of example, includes a common power drive shaft 20 which may be driven from any suitable mechanical source of power, such as an electric motor, with this shaft having fixed thereon a driving spur gear 21. A pair of driven shafts 22 and 23 are respectively provided with spur gears 24 and 25, fixed thereon, and intermeshed for opposite rotation, with the latter spur gear in turn meshed with the driving spur gear 21. The driven shaft 22 may be intended and utilized for forward drive of the projector and camera mechanisms and the driven shaft 23 intended and utilized for reversed rotation thereof. Driven shaft 22 is connected to projector magnetic clutch #1 and the camera magnetic clutch #2, respectively illustrated at 26 and 27. In like fashion, driven shaft 23 is connected to projector magnetic clutch #3 and camera magnetic clutch #4, respectively illustrated at 28 and 29. These four magnetic clutch units 26 to 29 inclusive may be of similar construction, respectively including driving members 30, 31, 32, and 33 and driven members 34, 35, 36 and 37. The clutch driving members 30 and 31 are fixed to the driven shaft 22 for drive therewith, and the clutch driving members 32 and 33 are fixed to the driven shaft 23 for drive thereby. Each of the clutch driven members 34, 35, 36 and 37 may respectively be provided with friction clutch facings 38, 39, 40 and 41, which, upon energization of the clutches, will be brought to frictional engagement of faces of the respective clutch driving members 30, 31, 32 and 33. The clutch driven members 34, 35, 36 and 37 are preferably fixed to, for rotation with, stub shafts 42, 43, 44 and 45, each respectively carrying fixed thereon spur gears 46, 47, 48 and 49. Driving spur gears 46 and 48 are meshed with a driven spur gear 50 for alternate drive thereof in opposite directions, and spur gear 50 is fixed upon projector drive shaft 51. In similar fashion, driving spur gears 47 and 49 are meshed with a driven spur gear 52 fixed upon camera drive shaft 53.

Certain stop motion means are associated with the projector and camera drives including respectively the drive shafts 51 and 53. Drive shaft 51 carries fixed therein a rotary cam 54, preferably in the form of a circular disc, provided with suitable abutment means for engagement by stop motion latching means. For this purpose, rotary disc cam 54 may have its circular edge 55 provided at one point with a notch 56. The camera rotary drive shaft 53 preferably carries fixed thereon a similar rotary disc cam 554 having its circular edge 555 provided with similar abutment means defined by a notch 556.

A pair of stop motion solenoids (A) and (B), indicated respectively at 59 and 60, are provided at positions 180° apart for cooperation with the notched rotary disc cam 54. A single solenoid (C), indicated at 61 in FIG. 1, is provided for cooperation with the single notched cam 554. Each of the solenoids (A), (B) and (C) is equipped with latching means which may be in the form of biased armature means, preferably spring-urged core plungers, to cooperate with the rotary disc stop motion and holding cams 54 and 554, so as to constitute with the latter magnetically-operated latch means for engagement respectively of the mechanism driving means of the projector and camera units. Thus, there are a pair of projector stop motion electromagnetic means provided by the solenoids (A) and (B) and their core plungers in cooperation with the notched rotary disc cam 54, and a single such camera stop motion electromagnetic means provided by the solenoid (C) and its plunger in cooperation with the notched rotary disc cam 554.

The notch 56 of the projector stop motion rotary disc cam 54 is defined preferably by opposed, circumferentially-spaced flat side walls 57 and 58 (FIG. 7) and at least the former serves as engageable stop abutment means, to be engaged alternately by the latching means or nose of the plungers of the projector solenoids (A) and (B), at 59 and 60, in radial stop and start positions of the projector drive. Likewise, the notch 556 of the camera stop motion rotary disc cam 554 is defined by opposed, circumferentially-spaced side walls 557 and 558 (FIG. 7) and at least the former serves as engageable stop abutment means, to be engaged by the latching means armature or nose of the plunger of the camera solenoid (C) at 61 in the radial stop and start position of the camera drive.

With the solenoids (A) and (B) located at points 180° apart, they are arranged in diametrically opposed relation and their plungers are in substantial alignment. The latching plungers 62 and 63 respectively of solenoids (A) and (B) preferably are alike, each consisting of a cylindrical rod of magnetically permeable material preferably having its notch-engaging tip end, 64 or 65, rectangularly shaped to have a relative wide abutment face to be positioned in the path of flat abutment side wall 57 of rotary cam disc notch 56. Each of these plunger cores 62 and 63 is biased, preferably by suitable spring means 66 and 67 toward the rotary disc cam 54, so that when one of these solenoids which operates this plunger is de-energized the tip end of its nose, 64 or 65, will ride on the circumferential or circular edge 55 ahead of and behind the notch 56 until brought to alignment with the notch and then to snap thereinto for stop motion holding of the projector mechanism drive including driven shaft 51. Each of the solenoid plungers 62 and 63 has associated therewith suitable circuit opening and closing means, such as a switch operating cam, preferably carried thereby. For example, solenoid plunger 62 may carry on one side thereof a wedge-shaped cam 68 with the oblique surface thereof riding in engagement against an operating member 69 of a circuit opening and closing Microswitch 70 provided with terminal connections 71 and 72. In like fashion solenoid plunger 63 carries on a side thereof a similar wedge-shaped cam 73 riding along in engagement of a switch operating member 74 of another Microswitch 75 having circuit terminal connectors 76 and 77. Solenoid (C), at 61, is provided with a cylindrical core plunger 78 preferably having a rectangular nose 79 adapted to engage in like fashion into the notch 556 of rotary disc cam 57, in the path of abutment side wall 557 thereof, with its tip end adapted to ride on the circular cam edge 555 ahead of and behind the notch due to biasing by similar spring 567. Similarly solenoid plunger 78 carries on a side thereof a wedge-shaped cam 80 with its oblique surface adapted to ride along in engagement of a switch operator 81 of a third Microswitch 82 having terminal connectors 83 and 84.

In these respects the plunger solenoids (A), (B) and (C) are substantially alike, but the solenoid plunger 78 differs in that it carries some additional means to operate another circuit switch. Such additional switch operating means may be in the form of a rear extension 85 projecting from the opposite end of the solenoid winding with its tip end 86 adapted to engage operating member 87 of a fourth Microswitch 88 having circuit terminal connectors 89 and 90, for a purpose to be explained later in connection with the present invention. The driven shaft 53 of the camera mechanism drive is also connected to or carries a timing cam 91 which may be fixed to the notched stop motion rotary disc cam 554, such as by being made integral therewith. A cam follower 92 rides on the peripheral edge of the cam 91 to operate in properly timed relation a fifth circuit opening and closing means, preferably also in the form of a Microswitch 93 having circuit terminal connectors 94 and 95. The rear extension 85 of solenoid core plunger 78, the Microswitch 88 operated thereby, the supplemental timing cam 91 and the Microswitch 93 operated by the latter, and suitable circuitry described later constitute non-skip and non-repeat film frame control means of the present invention, as is hereinafter explained.

Figure 2:
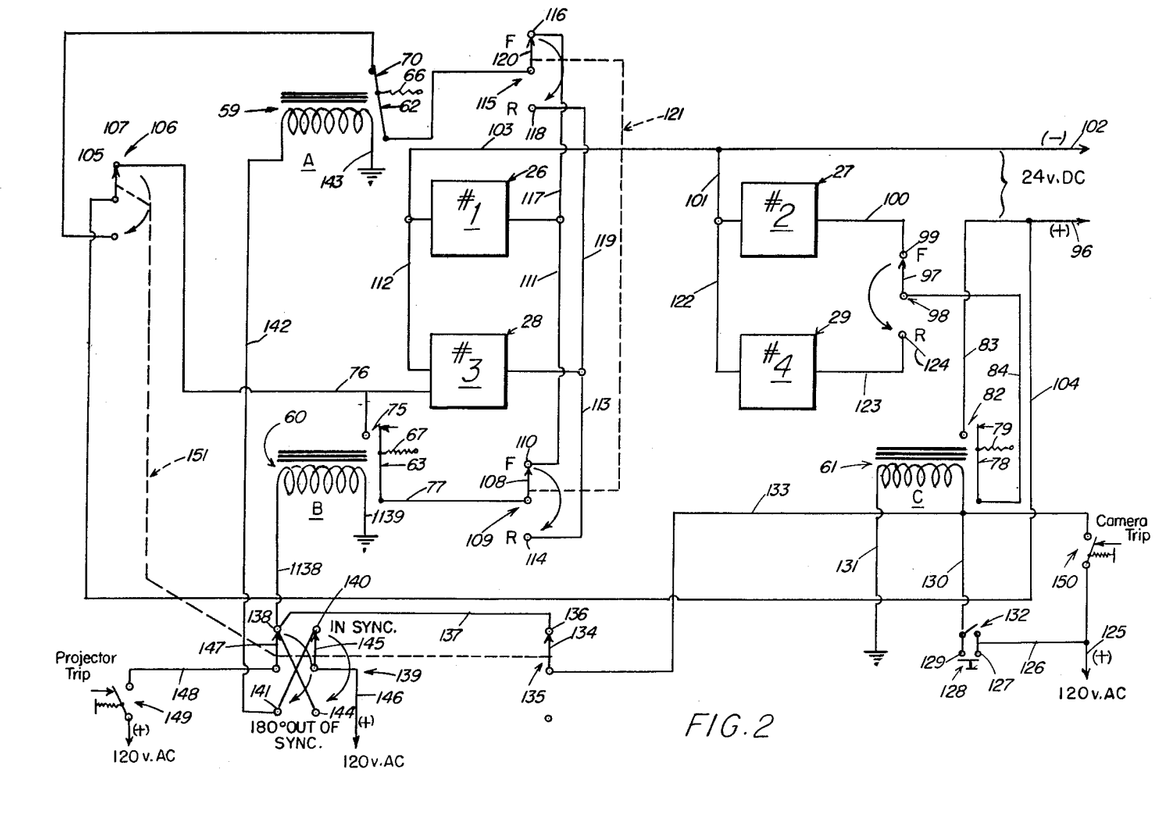
FIG. 2 is a schematic diagram of typical circuitry of the optical printer illustrated in FIG. 1, but omitting therefrom the circuitry of the improvement of the present invention.
Figures 3, 4, 5, 6, 7, 8, 9, 10:
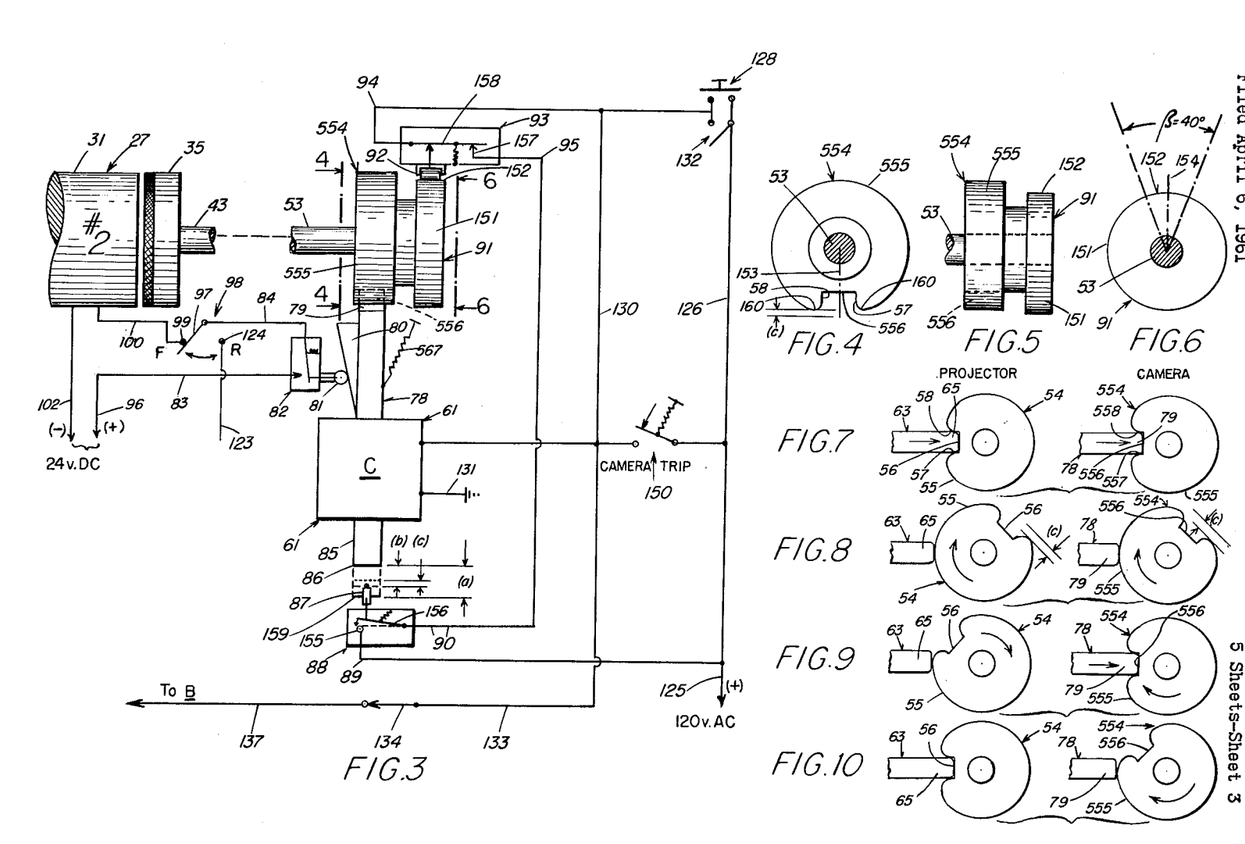
FIG. 3 is a plan view of part of the drive and control mechanism illustrated in FIG. 1, with parts broken away, schematically illustrating circuitry of control mechanism of the present invention associated therewith.
FIG. 4 is a view taken substantially on line 4—4 of FIG. 3, showing in end elevation certain cam structure thereof.
FIG. 5 is a side elevational view of combined cam structure illustrated in FIG. 3, including that shown in FIG. 4.
FIG. 6 is a view taken substantially on line 6—6 of FIG. 3, showing an end elevation of additional cam structure associated with that depicted in FIG. 4 and included in FIG. 5.
FIG. 7 is a diagrammatic view of certain stop motion means for respective projector and camera drives illustrated in FIG. 1 and illustrating relative orientations thereof in their respective stop and start positions.
FIG. 8 is a diagrammatic view similar to FIG. 7 illustrating similar parts in synchronous rotation thereof.
FIG. 9 is a diagrammatic view similar to FIGS. 7 and 8 showing the same parts in their respective orientations when they are out of synchronism which gives rise to the condition of a skipped film frame.
FIG. 10 is a diagrammatic view similar to FIGS. 7 and 8 showing the same parts in their respective orientations when they are out of synchronism which gives rise to the condition of a repeated film frame.

The wiring diagram of FIG. 2 illustrates the circuitry of the driving and control mechanism of FIG. 1, but without inclusion of the non-skip and non-repeat film frame control means which is illustrated in FIG. 3 in association with its circuitry. As will be seen from FIG. 2, power supply circuitry for the magnetic clutches 26, 27, 28 and 29 may be in the form of a relatively low voltage source of D.C., such as 24 v. The plus side 96 of this 24 v. D.C. supply circuit is connected to the terminal connector 83 of the Microswitch 82 operated by the solenoid plunger 78 and with the other terminal connector 84 of this switch connected to movable contact 97 of a single-pole, double-throw forward and reverse switch 98. The fixed "forward" (F) contact 99 of the forward and reverse switch 98 is connected by a conductor 100 to one end of the coil of the camera magnetic clutch 27, and with the other end thereof connected by conductor 101 to the minus side 102 of the 24 v. D.C. power supply. A conductor 103 also connects the minus side 102 of the 24 v. D.C. power supply to one end of the coil of the projector magnetic clutch 26. A conductor 104 also connects the plus side 96 of the 24 v. D.C. to the movable contact 105 of another single-pole, double-throw switch 106, having one of its fixed contacts 107 connected to terminal connector 76 of Microswitch 75. The other terminal connector 77 of the latter switch is connected to the movable contact 108 of a second forward and reverse single-pole, double-throw switch 109, with fixed "forward" (F) contact 110 of the latter connected by conductor 111 to the other end of the coil of the projector magnetic clutch 26. Thus, the projector magnetic clutch 26 and the camera magnetic clutch 27, which are provided for forward drive respectively of the projector drive mechanism and the camera drive mechanism, are connected in parallel to the 24 v. D.C. supply circuit.

For reverse operation of the projector drive mechanism and the camera drive mechanism, one end of the coil of the projector magnetic clutch 28 is connected by a conductor 112 to wire 103 in turn connected to the minus side 102 of the 24 v. D.C. supply circuit. The other end of the coil of the magnetic clutch 28 is connected by a conductor 113 to the other fixed "reverse" (R) contact 114 of the single-pole, double-throw forward and reverse switch 109. A third forward and reverse switch 115 is provided and has its fixed "forward" (F) contact 116 connected by a conductor 117 to conductor 111 which in turn is connected to the fixed contact 110 of the forward and reverse switch 109. The other fixed "reverse" (R) contact 118 of the forward and reverse switch 115 is connected by a conductor 119 to the conductor 113 which in turn is connected to the fixed "reverse" (R) contact 114 of the forward and reverse switch 109. Movable contact 120 of forward and reverse switch 115 is mechanically linked to the movable contact 108 of the forward and reverse switch 109, as is indicated by the dotted line 121, for simultaneous manipulation. One end of the coil of the reverse drive camera magnetic clutch 29 is connected by conductor 122 to the conductor 101 in turn connected to the minus side 102 of the 24 v. D.C. power supply, with the other end of the coil of this clutch connected by a conductor 123 to fixed "reverse" (R) contact 124 of forward and reverse switch 98.

It will thus been seen that with the three forward and reverse switches 98, 109 and 115 manipulated to circuit closure as is illustrated in FIG. 2, the forward driving projector magnetic clutch 26 and the forward driving camera magnetic clutch 27 will be connected in parallel to the 24 v. D.C. power supply upon closure of the two Microswitches 75 and 82 controlled by the stop motion solenoids (B) and (C). For purposes of simplicity, all operations hereinafter will be described in connection with the energization and deenergization of the forward drive projector magnetic clutch 26 and the forward drive camera magnetic clutch 27, but it will be understood that if reverse drives of the projector drive mechanism and the camera drive mechanism is desired the operator will throw the movable contacts 97, 108 and 120 respectively of the forward and reverse switches 98, 109 and 115 to their opposite positions for energization of the reverse drive projector and camera magnetic clutches 28 and 29. It is also to be understood that the main circuitry may be simplified if for the purpose of reverse operation of the projector and camera mechanisms the main power drive source itself be operated in the reverse direction, such as by reversing the driving motor.

Separate power supply circuitry is provided for operation of the solenoids (B) and (C) at 60 and 61. As will be seen from FIG. 2, such power supply may be a 120 v. A.C. having its plus terminal 125 connected by a conductor 126 to one of the fixed contacts 127 of a push button switch 128, and with the other fixed contact 129 thereof connected by a conductor 130 to one end of the coil of solenoid 61, the other end of the latter being connected by a conductor 131 to the ground side of the 120 v. A.C. power supply. The push button switch 128 may be employed for single revolution drive of the projector drive mechanism and the camera drive mechanism, but, if desired, it may be held down to circuit closing position for (n) number of plurality of revolutions or cycles thereof. The push button switch 128 may also be bridged by a timer switch 132 which can be set for closure through any desired number (n) of revolutions of the drives of the photographic units or the projector and the camera. Thus, either the push button switch 128 or the timer switch 132 may constitute the master control switch in the 120 v. A.C. power supply circuitry.

A conductor 133 connects conductor 130 to one contact, such as movable contact 134, of an interlock switch 135, with the other contact 136 thereof connected by a conductor 137 to fixed contact 138 of a double-pole, double-throw sync. conditioning switch 139. Conductor 137 is also connected by conductor 1138 to one end of the coil of stop motion solenoid 60, with the other end thereof connected by conductor 1139 to the common ground side of the 120 v. A.C. power supply. Thus the coils of the projector stop motion solenoid (B) at 60 and the camera stop motion solenoid (C) at 61 are connected in parallel to the 120 v. A.C. power supply, to be energized for simultaneous closure of the Microswitches 75 and 82 upon closure of this circuit either by the master control push button switch 128 or the timer switch 132.

The double-pole, double-throw switch 139 is provided selectively to attain in sync. operation of the optical printer or 180° out of sync. operation thereof. For this purpose, fixed contact 140 thereof which is paired with fixed contact 138 on one side is cross connected to fixed contact 141 on the other side which in turn is connected by conductor 142 to one end of the coil of solenoid (A) at 59, with the latter having its other end connected by conductor 143 to common ground. Fixed contact 144 which is paired with fixed contact 141 of switch 139 is cross connected to fixed contact 138. Movable contact 145 of switch 139, which alternately makes contact with fixed contacts 140 and 144, is connected by a conductor 146 to the plus side of a suitable power supply circuit, such as the 120 v. A.C. circuit. Thus, when switch 139 is manipulated to the in sync. position shown in FIG. 2, solenoid (A) at 59 is energized so as to close the Microswitch 70 and hold it closed during all in sync. operation.

The other movable contact 147 of switch 139, which alternately makes contact with fixed contacts 138 and 141, is connected by conductor 148 to a projector trip switch 149 and thence to a separate power supply or the same 120 v. A.C. power supply circuit. Also a camera trip switch 150 is connected between the plus side 125 of 125 v. A.C. and the common connection of the parallel connected coils of the solenoids (B) and (C) at 60 and 61. Mechanical linkage, illustrated by the dotted line 151, interconnects the movable contact 105 of switch 106, the movable contacts 145 and 147 of the switch 139 and the movable contact 134 of the interlock switch 135 together, so that for in sync. operation these switches are closed in the manner indicated in FIG. 2, permitting the solenoids to be energized and de-energized selectively at any of the push button switch 128, the timer switch 132, the camera trip switch 150, and the projector trip switch 149.

When the movable contacts 145 and 147 of the sync. conditioning switch 139 are thrown down to the 180° out of sync. position, the interlock switch 135 is opened to disconnect the parallel connection of one end of each of the coils of the stop motion solenoids (B) and (C) at 60 and 61 and to reverse the connections of the switch 106, thereby leaving the camera stop motion solenoid at 61 connected through the master control switch to the 120 v. A.C. power supply and providing a separate power supply through movable contact 145 of the switch 139 for the projector stop motion solenoid at 60, which will thus not be under the control of the master control switch. Simultaneously the movable contact 147 of the switch 139 connects the projector trip switch 149 and the power supply it controls to the solenoid (A) at 59. Consequently, in the 180° out of sync. position of switch 139 the solenoid (B) is constantly energized so that its latching plunger 63 will be held constantly out of engagement with the projector drive cam 54 while the latching plunger 62 of solenoid (A) will be permitted to cooperate therewith and serve as the stop motion device when it is brought to alignment with the notch 56 of this cam. Thus various types of desired skip-frame operation which may be dictated by automatic control means for the camera trip switch 150 and the projector trip switch 149 may be attained when switch 139 is in the 180° out of sync. position. For this purpose a variety of types of automatic controls, such as perforated traveling bands associated with a pair of switches responding to programmed perforations in passing or programming electronic switch apparatus, may be employed selectively to manipulate circuit closing and opening devices for the separate camera and projector stop motion solenoids, to provide the functions of or to manipulate the projector trip switch 149 and the camera trip switch 150, for attaining a variety of effects provided by programmed skip frame operation. The usefulness of the present invention which effectively prevents non-skip and non-repeat film frame operation is restricted to the in sync. conditioning of the circuitry by the switch 139 whereby the projector stop motion solenoid (B) and the camera stop motion solenoid (C) are connected in parallel for simultaneous operation from a common master control switch, with the stop motion solenoid (A) constantly energized to deactivate its latching plunger 62 with respect to the stop motion cam 54.

Unfortunately, due to inertia of parts and natural lag of mechanical operating devices it is not possible to operate the projector drive mechanism and the camera drive mechanism precisely in synchronism at all times from a common master control switching device. This problem is effectively solved by associating with either the projector stop motion solenoid (B) at 60 or the camera stop motion solenoid (C) at 61 the device of the present invention which provides a controlled by-pass circuit for the solenoid with which it is associated.

Such non-skip and non-repeat film frame control means is illustrated in FIG. 3. As is therein shown, by way of example, this control means may be associated with the camera forward driving magnetic clutch 27 (or for reverse operation by suitable manipulation of the reversing switches the camera reverse driving magnetic clutch 29), and the camera stop motion solenoid (C), with the latter serving as the master stop motion electromagnetic means. For this purpose, the camera drive shaft 53 may have fixed thereon control cam 91, as has been previously indicated, and a suitable contour of this cam may be best understood from FIG. 6. Cam 91 preferably is in the form of a circular rotary disc having a circular edge 151 provided with a switch operating sector in the form of a flatted section 152. The switch operating flatted section 152 is so oriented with respect to the radial stop and start position of the stop motion cam 554, dictated by the location of solenoid plunger engaging notch 556, as to be effective with respect to the operation of the control microswitch 93. For example, with the stop motion cam 554 of FIGS. 3, 4 and 5 and rotary timing control cam 91 fixedly carried therewith a radius, indicated at 153 in FIG. 4, which extends through the center of the stop motion cam notch 556 may be 180° from a radius, indicated at 154 in FIG. 6 which extends through the center of the flatted off section 152. The flatted off section or switch operating sector 152 of the timing control cam 91 is provided to close and maintain closure of a by-pass holding circuit connected around the master control switch, i.e., the push button switch 128, or the timer switch 132, or the camera trip switch 150, so as to prevent de-energization under certain conditions of the master stop motion solenoid, such as the camera stop motion solenoid (C), when its latching plunger is aligned with the notch 556 of the stop motion cam 554. It is to be understood, however, that any desired angular relationship may be provided between the position of the latching notch 556 in the stop motion cam 554 and the switch operating sector 152 of the rotary timing cam 91, so long as the by-pass holding circuit switch 93 is so oriented with respect to the latter as to be operated when the stop motion cam notch is aligned with the stop motion plunger of the master stop motion solenoid with which it is associated. It is further to be understood that the switch operating sector 152 of the rotary timing cam 91 need not be located on the periphery thereof since it can be provided on one end thereof, such as in the form of an axially projecting sectoral lobe, to operate a switch designed to perform the functions of switch 93 in properly timed relation to the latching action. The cam contour of FIG. 6 is suitable for use when the switch 93 is of the biased-closed type, so that its operating cam follower 92 is on the flatted off section 152 at the moment of latching action to permit the biasing of the switch to manipulate it to circuit closing position, while allowing this cam follower to open this switch when the follower is riding on the lobe provided by the remaining circular edge portion 151 of the rotary timing cam, as is illustrated in FIG. 3 and in other figures there-following which illustrate the effectiveness of this non-skip and non-repeat film frame control means.

The by-pass holding circuit includes in series with switch 93 the other switch 88 which, as will be seen from FIG. 3, preferably is of the biased open type. Conductor 89 connects the plus side 125 of the 120 v. A.C. power supply circuit to one contact of the biased open Microswitch 88, such as its fixed contact 155, and its other contact 156, such as its movable spring-biased contact, is connected by terminal connector 90 to terminal connector 95 of the biased-closed microswitch 93. Terminal connector 95 of switch 93 may be connected to fixed contact 157 of switch 93 with movable contact 158 thereof in turn connected to terminal connector 94 which serves to connect the latter to conductor 130. Thus, when both microswitches 88 and 93 are closed the master control switches at 128 and 132 are by-passed and the power supply circuit is connected to the coil of the master control stop motion solenoid, such as the camera stop motion solenoid (C) at 61, to effect or maintain energization thereof and simultaneously of the other stop motion solenoid connected in parallel therewith, even though the master control switches be open. It will be noted from FIG. 3 that when the solenoid at 61 is energized to retract its latching plunger 78 for full throw (a), so that the tip end 86 of its rear extension 85 is moved back to the dash line position 159, the operating member 87 of switch 88 is pushed forward or depressed so as to close this switch. Consequently, when the master stop motion solenoid (C) is energized switch 88 is closed so as to condition the by-pass holding circuit for control by the other series switch 93 therein.

The adjustments of the Microswitch 82 in the circuit of the magnetic drive clutch 27 and those of Microswitch 88 may be related in various ways to attain proper closure of the power supply circuit for the magnetic clutch in timed relation to the opening and closing of the by-pass holding circuit at switch 88. For example, on energization of the solenoid (C) at 61, to effect full throw (a) of the latching solenoid plunger 78, by-pass holding circuit switch 88 will be closed and held closed thereby. Simultaneously, the wedge cam 80 carried by the solenoid plunger 78 will close and hold closed the magnetic clutch control switch 82. With drive of the stop motion cam 554 and the timing cam 91 by the magnetic clutch driven member 35 engaged by clutch energization to the driving member 31, these cams will be rotated with the photographic unit or camera mechanism drive shaft 33. If the master control switch, 128 or 132, is released at a time when solenoid plunger 78 is not aligned with the notch 556 in stop motion cam 554 and outside the angle of flatted off section 152 of timing cam 91 solenoid (C) will be de-energized to permit the biasing spring 567 to thrust the solenoid plunger 78 forward to abut the tip of its nose 79 against the circular edge 555, or "the round" of cam 554, so that it may ride thereon. This biased forward movement or thrust of solenoid plunger 78 may be through the distance of (a) minus (b) to the dot-dash position indicated in FIG. 3. With such forward motion of the solenoid plunger 78, the by-pass holding circuit switch 88 is opened. However, closure of the supply circuit for the driving magnetic clutch 27 is held closed at the Microswitch 82 during this increment of biased forward motion of the solenoid plunger 78, and will not be opened by the latter until the solenoid plunger moves further forward through the distance (b), or during some increment of this bias thrust distance. On the other hand, if it is desired to open the circuit of the magnetic clutch 27 shortly before solenoid plunger 78 is brought to alignment with the notch 556 in cam 554, so that the latter coasts to latching position for indexing the solenoid plunger into this notch, the switch 82 can be permitted to open during an increment (c) of the return biased motion (b). This may be attained by rounding off the noses 160 of the cam 554 at the entrance to its notch 556, as is indicated in FIGS. 4 and 8, so that as the nose 79 of plunger 78 rides in biased contact with the circular edge or the round 555 of this cam it will move inwardly the distance (c) as it rides over this curved nose on the approach side before precise alignment to drop into the notch 556. In this event, although the driving magnetic clutch 27 becomes de-energized slightly before the nose 79 of solenoid plunger 78 is brought to alignment with the cam notch 556 to drop thereinto, so that the camera drive mechanism is not driven, the latter will coast sufficiently to bring the solenoid plunger to latching engagement within the cam notch. Also, this feature of rounding off the noses 160 may be utilized to advantage even though the switch 82 is not permitted to open until the solenoid plunger nose 79 drops into the cam notch 556. Since there is some lost motion even in Microswitch structures and an inherent lag in operating characteristics, permitting the solenoid plunger 78 to thrust forward under the power of biasing spring 567 the distance (c) can offset these undesirable characteristics to an appreciable degree, preparing the Microswitch for almost instantaneous opening when its operating cam 80 moves a very small increment of distance beyond the preparatory distance (c).

Figure 11:
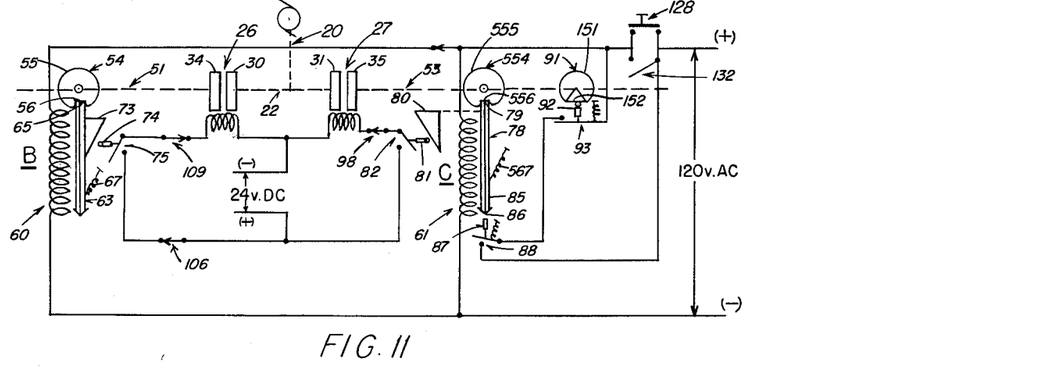
FIG. 11 is a schematic wiring diagram of the electrical circuitry of the mechanism shown in FIG. 1, illustrating relative positions of parts at the stop and start condition of the apparatus.

FIG. 7 diagrammatically illustrates the relative positions of the projector stop motion cam 54 and camera stop motion cam 554 and the latching solenoid plungers 63 and 78, respectively associated therewith, when the drive mechanisms of the projector and camera units are in their stop and start positions. The leading flat abutment side wall 57 of notch 56 in projector stop motion cam 54 may abut the opposed flat side of the tip 65 of projector solenoid plunger 63, as does that at 557 of the camera stop motion cam 554 with respect to tip 79 of camera stop motion solenoid plunger 78, when these are respectively in their latched positions. FIG. 11 illustrates the conditioning of the circuit of the optical printer, and relative positions of parts, for the start position illustrated in FIG. 7. It will be noted from FIG. 11 that both of the driving solenoids 26 and 27 are de-energized with the switches 75 and 82 in their respective supply circuits being open. The latching solenoid plungers 63 and 78 have their respective noses 65 and 79 biased into the notches 56 and 556 of the stop motion projector and camera cams 54 and 554. At this same instant, the flatted off section 152 of timing cam 91 is substantially medially located with respect to the cam follower 92 serving as the operating member for opening the biased-closed Microswitch 93, so that the latter is closed while the other series switch 88 in the by-pass circuit is open.

Figure 12:
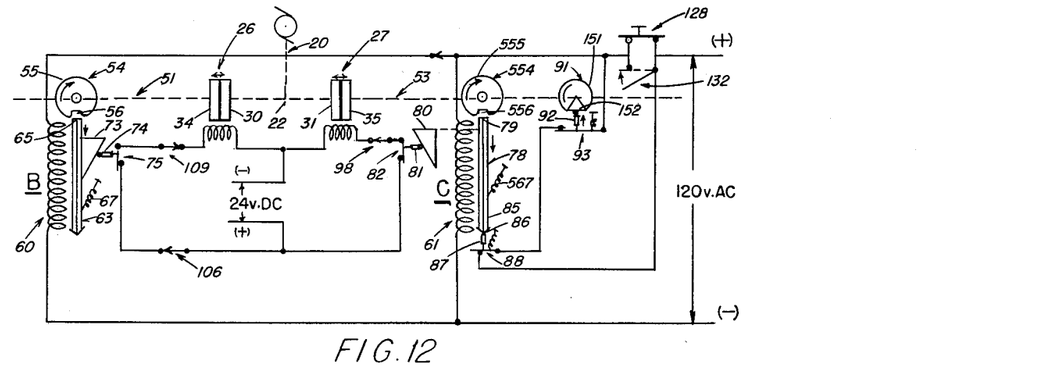
FIG. 12 is a schematic wiring diagram similar to FIG. 11, showing the relative positions of parts as the master control switch is closed and the apparatus begins operation.

Let it now be assumed that the master control switch, either the push button switch 128 or the timer switch 132, is closed. The driving mechanisms of both the projector and camera units will then be conditioned for drive, as is illustrated in FIG. 12, the latching solenoid plungers 63 and 78 having their respective noses 65 and 79 withdrawn from the stop motion cam notches 56 and 556, to close the driving magnetic clutch circuits at switches 75 and 82, causing the magnetic clutches 26 and 27 to be energized for respective engagements of their driving and driven members 30 and 34, and 31 and 35. FIG. 12 diagrammatically illustrates the conditioning of the power supply circuits and the relative position of parts at the instant that this is accomplished, and shows that the energization of the camera stop motion solenoid 61 causes the tip end 86 of its plunger rear extension 85 to close the by-pass holding circuit switch 88, so that the holding circuit is closed both at this switch and at the timing switch 93 connected in series therein. Immediately the driving magnetic clutches 26 and 27 will begin drive or rotation of the projector and camera drive mechanisms, which at times may be in synchronism, to rotate the projector stop motion cam 54, the camera stop motion cam 554 and the timing cam 91.

Figure 13:
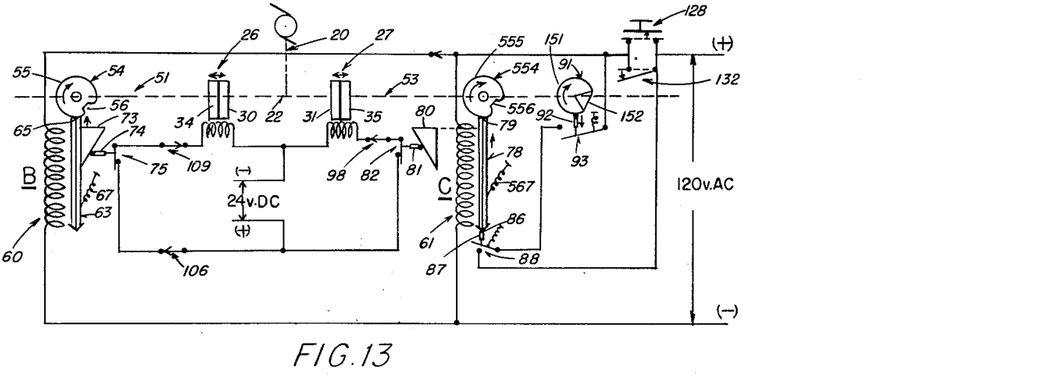
FIG. 13 is a schematic wiring diagram similar to FIGS. 11 and 12 showing the relative positions of parts after operation has begun with synchronous rotation of the stop motion mechanism as diagrammatically illustrated in FIG. 8 and following opening of the master control switch.

Let it be assumed that, at some particular instant of rotation after such operation has started, the flatted off section 152 of the timing cam 91 has no portion opposite the switch operating follower 92 of the by-pass holding circuit switch 93. Since now the switch operating follower 92 is riding on "the round" or circular edge lobe 151 of the timing cam 91, the by-pass holding circuit switch 93 will be opened, as is illustrated in FIG. 13. If now the projector and camera stop motion cams 54 and 554 are in synchronism and a cycle of rotation thereof is completed to bring the notches 56 and 556 thereof to alignment with the noses 65 and 79 of the solenoid plungers 63 and 78, the latter will drop in or be spring-biased forward into these notches provided the stop motion solenoids 60 and 61 are de-energized. If the master control switch is opened or released at such a time as is illustrated in FIGS. 8 and 13 with the by-pass holding circuit open at the timing switch 93, the solenoids 60 and 61 will be de-energized immediately, so that the noses 65 and 79 of the plungers 63 and 78 will be biased to ride on the rounds 55 and 555 of the stop motion cams 54 and 554 respectively, as is best seen in FIG. 8. The attendant biased forward thrust of the solenoid plunger 78 will permit the by-pass holding circuit switch 88 to open.

In the event that the master control switch, such as push button switch 128, was held closed for only such portion of one cycle of rotation or one revolution of the projector and camera drives only sufficiently long to permit the flattened off section 152 to pass the switch operating follower 92 and effect opening of the by-pass holding circuit timing switch 93, such as illustrated in FIG. 13. The driving magnetic clutches 26 and 27 will remain energized to rotate the stop motion cams 54 and 554 around until their notches 56 and 556 respectively are brought to alignment with the noses 65 and 79 of the solenoid plungers 63 and 78, and then the latter will drop in to open the magnetic clutch power supply circuits at the switches 75 and 82, regardless of whether the projector and camera mechanism drives were precisely in synchronism or not. If one of the stop motion cams was leading the other, each would be latched to stop position when its solenoid plunger was brought to alignment with the notch in its stop motion cam.

However, let it be assumed that the timer switch 132 had been employed to effect operation of the optical printer, so as to rotate the projector and camera drive mechanisms a plurality or number ($n$) cycles of rotation or revolutions. Under such conditions if the timer switch 132, serving as the master control switch, opened the solenoid circuits with the projector stop motion cam 54 leading the camera stop motion cam 554 and at the instant the power supply circuit for the stop motion solenoids 60 and 61 was broken by opening the timer switch the camera stop motion solenoid plunger 78 was precisely aligned with the notch 556 in the camera stop motion cam 554, then the nose 79 of this plunger would drop in, as is illustrated in FIG. 9. But, since the projector stop motion cam 54 is leading, the nose 65 of projector stop motion solenoid plunger 63 will strike on the round 55 of the projector stop motion cam 54, as is there illustrated, causing the camera mechanism drive to be stopped and held while the projector mechanism drive is permitted to make one more revolution until its notch 56 is brought around to alignment with the solenoid plunger nose 65 for dropping thereinto. This causes a skipped frame or the loss of a frame of the projector film, in the event that the non-skip and non-repeat film frame control means of the present invention is not associated with the remainder of the optical printer drives and circuitry. The condition of FIG. 9 is illustrated diagrammatically in the schematic wiring diagram of FIG. 14 showing the holding of the camera stop motion cam 554 by virtue of the latching of camera solenoid 61 while the projector magnetic driving clutch 26 is permitted to continue the drive of the projector mechanism the remainder of the one revolution.

Figure 14:
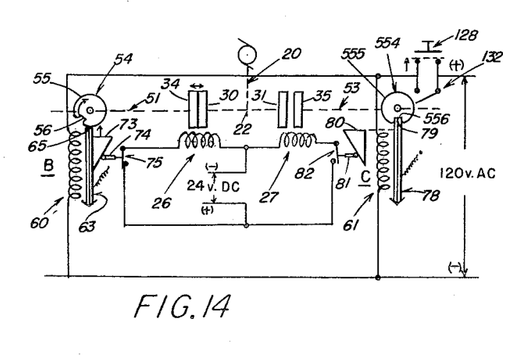
FIG. 14 is a schematic wiring diagram of the optical printer when the non-skip and the non-repeat film frame control means of the present invention is omitted therefrom and illustrating the skipped film frame condition of FIG. 9.
Figure 15:
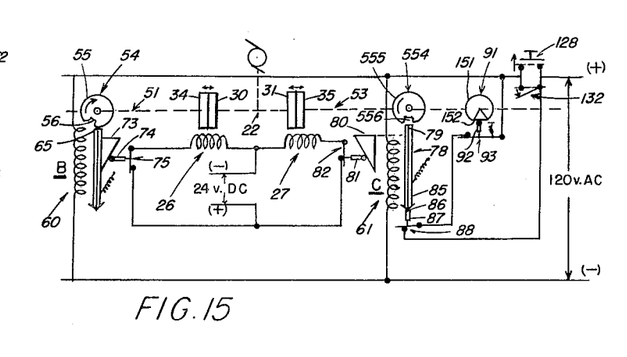
FIG. 15 is a schematic wiring diagram similar to FIGS. 11 to 13 inclusive, illustrating correction of the condition depicted in FIG. 14.

The schematic wiring diagram of FIG. 15 diagrammatically illustrates correction of this skipped frame problem of FIGS. 9 and 14. FIG. 15 shows that if the master control switch, either push button switch 128 held down for a plurality of cycles of rotation or timer switch 132 after ($n$) number of revolutions, is opened at the instant illustrated in FIGS. 9 and 14, with the projector sop motion cam 54 leading the camera stop motion cam 554 and the operating follower 92 of the timing switch 93 riding on the flatted off section 152 of the timing cam 91, this timing switch will be closed, as will the companion by-pass holding circuit switch 88 by virtue of the previous energization of the solenoid 61. This energization of solenoid 61 thus will be continued for continuance of the full retraction of the camera stop motion solenoid plunger 78 to hold its nose 79 back from contact with the camera stop motion cam 554 and out of its notch 556 to permit this stop motion cam also to rotate one more revolution. Energization of both stop motion solenoids is thus continued with full retraction of their plungers since they are connected in parallel to the ower supply circuit. Of course, with further in pace drive by energized magnetic clutches 26 and 27 of the projector and camera mechanism drives through the remainder of the cycle of rotation or this one revolution the timing cam 91 will be rotated with the camera drive eventually to carry its flatted off section 152 past the switch operating follower 92 and permit the remaining circular lobe 151 of the timing cam to open switch 93 and the by-pass holding circuit. Thus, during the remainder of the cycle of rotation or revolution of the camera stop motion cam 554 the projector and camera stop motion solenoids 60 and 61 will be de-energized with maintenance of energization of the magnetic clutches 26 and 27 to bring about the condition illustrated in FIG. 13 and permit the noses 65 and 79 of the solenoid plungers 63 and 78 to ride on the rounds 55 and 555 of the projector and camera stop motion cams 54 and 554 as both are rotated around again to successive alignment of these plungers with the cam notches 56 and 556. The noses 65 and 79 of the spring-biased plungers 63 and 78 released by the de-energized solenoids 60 and 61 will then drop in or be thrust forward successively into the cam notches 56 and 556. Thus, no frame of the projector film is permitted to be skipped in this manner.

Figure 16:
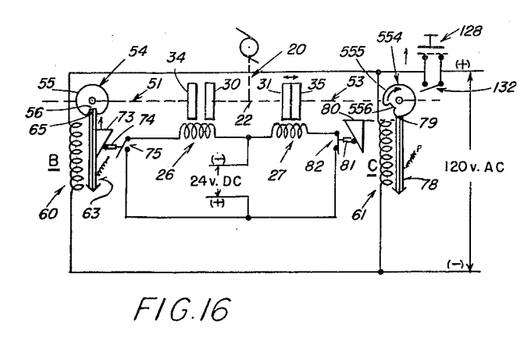
FIG. 16 is a schematic wiring diagram of the optical printer when the non-skip and the non-repeat film frame control means of the present invention is omitted therefrom and illustrating the repeated film frame condition of FIG. 9.
Figure 17:
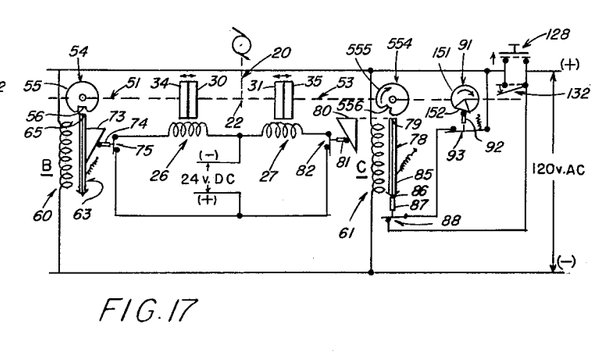
FIG. 17 is a schematic wiring diagram similar to FIG. 15, illustrating correction of the condition depicted in FIG. 16.

In the event that the camera stop motion cam 554 is leading the projector stop motion cam 54 and the master control switch is opened at the instant that the nose 65 of the projector stop motion solenoid plunger 63 is in precise alignment with the notch 56 of the projector stop motion cam, the condition of FIG. 10 obtains which causes the repeated frame problem illustrated in FIG. 16. The nose 65 of the projector solenoid plunger 63 will drop into the notch 56 of the projector stop motion cam 54 thereby opening the power supply circuit of the projector drive magnetic clutch 20 to de-energize it. At this instant, since the camera stop motion cam 554 is leading the projector stop motion cam 54, the nose 79 of the camera stop motion solenoid plunger 78 will be biased to the round 555 of the camera stop motion cam while holding closed the switch 82 in the power supply circuit of the camera drive magnetic clutch 27, thus permitting the camera mechanism to be driven one more cycle of rotation or revolution, causing repetition on the next frame of the raw stock camera film of the image of the film frame held at the projector aperture. FIG. 17 illustrates how the present invention solves this problem of a possible repeated frame which may result from the operation illustrated in FIG. 16.

As will be seen from FIG. 17, at the instant that the master control switch, 128 or 132, is opened with the latching plunger 63 of the projector stop motion solenoid 60 aligned with the notch 56 in the projector stop motion cam 54, but with the notch 556 of the camera stop motion cam 554 leading or rotated beyond alignment of the nose 79 of the latching plunger 78 of the camera stop motion solenoid 61, the by-pass holding circuit will be closed both at the timing switch 93 and at the switch 88 to continue energization of both the projector and camera stop motion solenoids. Consequently, their respective plungers 63 and 78 are held back in the fully retracted positions, causing the power supply circuits of the projector and camera drive magnetic clutches 26 and 27 to remain closed at the switches 75 and 82 for continued in pace drive together the remainder of one more revolution. When the flatted off section 152 of the timing cam 91 fully passes the switch operating follower 92 in this continued rotation of the camera mechanism drive, the by-pass holding circuit switch 93 then opens, permitting the noses 65 and 79 of the projector and camera solenoid plungers 63 and 78 to be thrust forward under biasing action for sliding contact with the rounds 55 and 555 of the projector and camera stop motion cams 54 and 554 until their respective notches 56 and 556 are brought successively to alignment with these plungers for drop in or thrust forward of these noses into these notches. Thus no such repeated frame operation is permitted.

As will be seen from FIG. 6 the flatted off section 152 of the timing cam 91 extends through an appreciable radial angle ($\beta$). In practice the angle ($\beta$) may be of the order of about 30° to 45°, but there is no critical limitation thereon. As a practical matter, the switch operating flatted off section 152 of the timing cam 91 should have an initial switch closing portion of appreciable extent leading the engageable abutment means provided by the trailing side wall 57 of the notch 56 in the stop motion cam 554 driven therewith, so as to effect by-pass control circuit closure before this stop motion abutment means is rotated forward to the solenoid armature or plunger engaging stop position. Also, as a practical matter, this flatted off switch operating section 152 of the timing cam 91 should have a succeeding portion of appreciable extent trailing this engageable abutment means 57 to maintain switch closure after the abutment means has rotated through and past the engaging stop position. As a result the closure of switch 93 will be maintained through an appreciable portion of each revolution of the driven shaft 53 controlled by the master stop motion solenoid 61. It should be realized that the showings in the drawings of various dimensions of stop motion elements, the timing cam, the circuit controlling microswitches and their throws, as well as the travels of the stop motion solenoid plungers, have been exaggerated for clarity. For example, the travel of switch operating members to effect switch opening and closing actions may be of the order of only a few thousandths of an inch.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In optical printer drive and control mechanism for synchronous operation of a projector and camera thereof the combination with power driving means, a first projector mechanism driving means, a second camera mechanism driving means, projector drive clutch means having engageable and disengageable rotary driving and driven members with the driving member connected to the power driving means and the driven member comprising a portion of the first projector mechanism driving means for coupling the power driving means to and uncoupling it from the projector mechanism driving means, camera drive clutch means having engageable and disengageable rotary driving and driven members with the driving member connected to the power driving means and the driven member comprising a portion of the second camera mechanism driving means for coupling the power driving means to and uncoupling it from the camera mechanism driving means, projector stop motion electromagnetic means having magnetically-operated latch means engageable of the first projector mechanism driving means temporarily to stop and hold the latter in a predetermined stop and start position and alternately to release it, camera stop motion electromagnetic means having magnetically-operated latch means engageable of the second camera mechanism driving means temporarily to stop and hold the latter in a predetermined stop and start position and alternately to release it, first power supply control means in the form of electrical circuitry connecting said projector and camera stop motion electromagnetic means in parallel including common master control switch means for simultaneous energization and deenergization thereof, and other power supply control means for said pair of projector and camera drive clutch means including a pair of individual operating means separately to engage and disengage their driven members with their driving members and with each of said individual clutch operating means being operable only by one of said stop motion electromagnetic means associated therewith for alternately coupling and uncoupling its driving and driven clutch members, non-skip and non-repeat film frame control means associated with one of said stop motion electromagnetic means comprising a by-pass holding circuit connecting said first power supply circuitry around said common control switch means to both of said stop motion electromagnetic means, a pair of circuit opening and closing means connected in series in said by-pass holding circuit with a first one of these series circuit opening and closing means being closed upon energization of the stop motion electromagnetic means with which it is associated and open upon de-energization of the latter, and timing means connected to for operation by the mechanism driving means which is stopped and released by said latter stop motion electromagnetic means effecting closure of the remaining second of said by-pass holding circuit opening and closing means when said master control switch is opened the instant this mechanism driving means reaches its stop and start radial position and holding it closed thereafter for only a predetermined portion of each cycle of rotation of the latter.

2. In optical printer drive and control mechanism for synchronous operation of a projector and camera thereof the combination with power driving means, a first projector mechanism driving means, a second camera mechanism driving means, projector drive magnetic clutch means having engageable and disengageable rotary driving and driven members with the driving member connected to the power driving means and the driven member comprising a portion of the first projector mechanism driving means for coupling the power driving means to and uncoupling it from the projector mechanism driving means, camera drive magnetic clutch means having engageable and disengageable rotary driving and driven members with the driving member connected to the power driving means and the driven member comprising a portion of the second camera mechanism driving means for coupling the power driving means to and uncoupling it from the camera mechanism driving means, projector stop motion electromagnetic means having magnetically-operated latch means engageable of the first projector mechanism driving means temporarily to stop and hold the latter in a predetermined stop and start position and alternately to release it, camera stop motion electromagnetic means having magnetically-operated latch means engageable of the second camera mechanism driving means temporarily to stop and hold the latter in a predetermined stop and start position and alternately to release it, first power supply circuitry connecting said projector and camera stop motion electromagnetic means in parallel including common master control switch means for simultaneous energization and de-energization thereof, and other power supply circuitry for said pair of projector and camera drive magnetic clutch means including a pair of energizing circuits with each connected to one of said magnetic clutch means, each of said magnetic clutch means energizing circuits including separate circuit opening and closing means operable by said stop motion electromagnetic means associated with the magnetic clutch means connected thereto for alternately coupling and uncoupling said driving and driven clutch members of the latter to actuate it separately from actuation of the other of said magnetic clutch means, non-skip and non-repeat film frame control means associated with one of said stop motion electromagnetic means comprising a by-pass holding circuit connecting said first power supply circuitry around said common control switch means to both of said stop motion electromagnetic means, a pair of circuit opening and closing means connected in series in said by-pass holding circuit with a first one of these series circuit opening and closing means being closed upon energization of the stop motion electromagnetic means with which it is associated and open upon de-energization of the latter, and timing means connected to for operation by the mechanism driving means which is stopped and released by said latter stop motion electromagnetic means effecting closure of the remaining second of said by-pass holding circuit opening and closing means when said master control switch is opened the instant this mechanism driving means reaches its stop and start radial position and holding it closed thereafter for only a predetermined portion of each cycle of rotation of the latter.

3. The optical printer drive and control mechanism as defined in claim 2 characterized by said second by-pass holding circuit opening and closing means being a switch, and said timing means being cam means mechanically connected to for drive by said mechanism driving means which operates it, said timing cam means having a switch operating sector extending through an appreciable radial angle effecting closure of said by-pass holding circuit series switch prior to the instant this mechanism driving means reaches its stop and start radial position and during a predetermined portion of each cycle of rotation of the latter after rotary drive thereof has started.

4. The optical printer drive and control mechanism as defined in claim 2 characterized by said pair of series opening and closing means in said by-pass holding circuit being associated with said second camera mechanism driving means and the stop motion electromagnetic means which holds and releases the latter.

5. The optical printer drive and control mechanism as defined in claim 2 characterized by said pair of series opening and closing means in said by-pass holding circuit being first and second switches connected in series therein with this holding circuit being associated with said second camera mechanism driving means and the stop motion electromagnetic means which holds and releases the latter, said timing means being cam means mechanically connected to for drive by said camera clutch driven member having a switch operating sector closing said second by-pass holding circuit series switch prior to the instant said second camera mechanism driving means reaches its stop and start radial position and during a predetermined portion of each cycle of rotation of the latter after rotary drive thereof has started.

6. In optical printer drive and control mechanism for synchronous operation of a projector and camera thereof the combination with mechanical power driving means, projector mechanism driving means including a first driven rotary shaft, camera mechanism driving means including a second driven rotary shaft, a projector drive magnetic clutch having engageable and disengageable rotary driving and driven members with the driving member connected to the power driving means and the driven member connected to said first shaft for selectively coupling and uncoupling the latter to and from said power driving means, a camera drive magnetic clutch having engageable and disengageable rotary driving and driven members with the driving member thereof connected to the power driving means and the driven member thereof connected to said second shaft for selectively coupling and uncoupling the latter to and from said power driving means, projector drive power supply circuit means connected to said projector clutch including a first projector drive control switch selectively for energizing and de-energizing said projector clutch alternatively to couple said first shaft to said power driving means and uncouple it therefrom, and camera drive power supply circuit means connected to said camera clutch including a second camera drive control switch selectively for energizing and de-energize said camera clutch alternatively to couple said second shaft to said power driving means and uncouple it therefrom, stop motion means comprising a pair of first and second rotary stop motion cams respectively connected to for rotation with said first and second shafts each having engageable abutment means in a stop and start radial position, a pair of first and second solenoids each having a biased armature separately engageable of the abutment means of only one of said cams temporarily to hold the latter and the shaft connected thereto in their stop and start position when this solenoid is de-energized and to release them from this position when this solenoid is energized to permit clutch driven rotation thereof, means connecting said armature of said first solenoid to said first drive control switch for closing the latter upon energization of this solenoid and to open this switch upon stop engagement of the abutment means of said first cam by this armature, other means connecting said armature of said second solenoid to said second drive control switch in like fashion with respect to said second cam, and power supply circuitry connecting said magnetic clutches in parallel including common master control switch means for simultaneous energization and de-energization thereof; and non-skip and non-repeat film frame control means associated with one of said solenoids as the master solenoid comprising a by-pass holding circuit connecting said power supply circuitry around said common control switch means to both of said solenoids, a pair of first and second control switches connected in series in said by-pass holding circuit with the first one thereof being normally open and operable to closure by the armature of said master solenoid when the latter is energized, and timing means including a rotary timing cam mounted for rotation with the stop motion cam associated with said master solenoid having a switch operating sector extending through an appreciable radial angle in a radial position effecting closure of said second control switch prior to the instant said master solenoid armature is manipulated to stop engagement of said stop motion cam associated therewith in a radial stop position, said cam lobe holding said second by-pass circuit control switch closed for only a predetermined portion of each cycle of rotation beyond the stop position of said rotary timing cam with said rotary stop motion cam which is associated with said master solenoid after rotary drive together of these timing and stop cams has started.

7. The optical printer drive and control mechanism as defined in claim 6 characterized by said switch operating sector having an initial switch closing portion leading the engageable abutment means of the stop motion cam driven therewith effecting by-pass control circuit closure before said cam abutment means is rotated forward to the solenoid armature engaging stop position and also a portion trailing this engageable abutment means to maintain switch closure after the abutment means has rotated through and past the engaging stop position with this switch closure being maintained through an appreciable portion of each revolution of the driven shaft controlled by said master solenoid.

8. The optical printer drive and control mechanism as defined in claim 7 characterized by said timing cam being a disc having a circular edge provided with a sectoral flatted section as its switch operating sector.

9. The optical printer drive and control mechanism as defined in claim 8 characterized by said stop motion cams being discs each having a circular edge provided with a radial notch defining the engageable stop abutment means thereof, said armatures of said solenoids being in the form of forwardly biased magnetically retractable plungers each having a nose engageable in the notch of the stop motion cam associated therewith and ridable in engagement with the circular edge of the associated stop motion cam disc on opposite sides of the notch in the latter, said second by-pass circuit control switch being biased toward closed position and having an operable cam follower riding on the circular edge of said timing cam disc with this switch open and on the flatted sectoral section thereof with this switch closed.

No references cited.